(No Model.)
H. C. WHEELER.
KITCHEN CABINET.
No. 561,462.  Patented June 2, 1896.
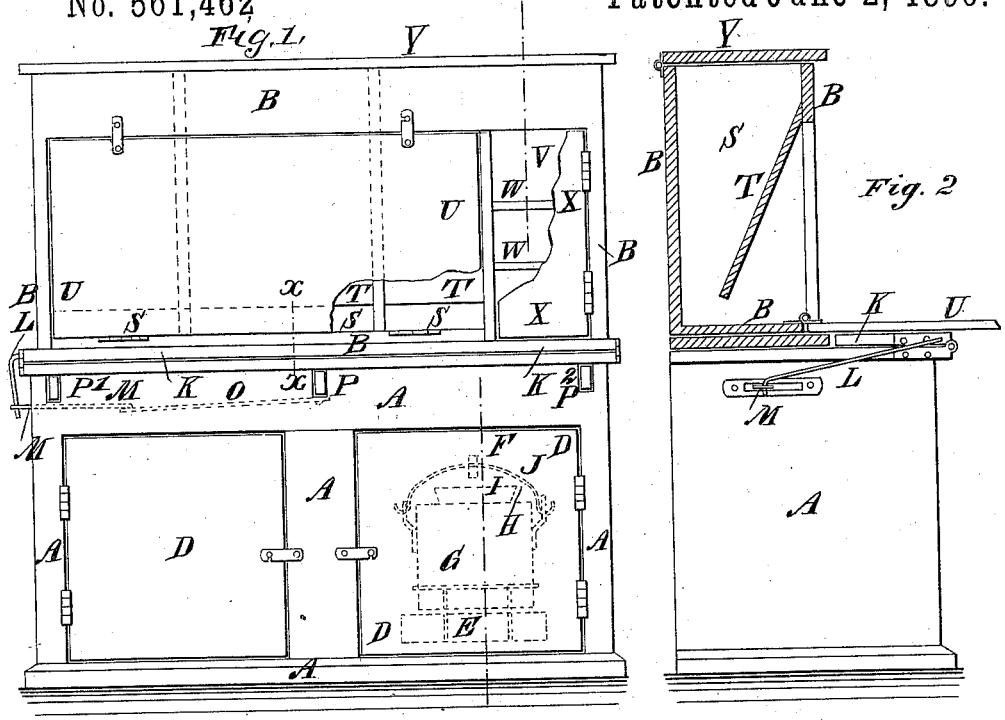
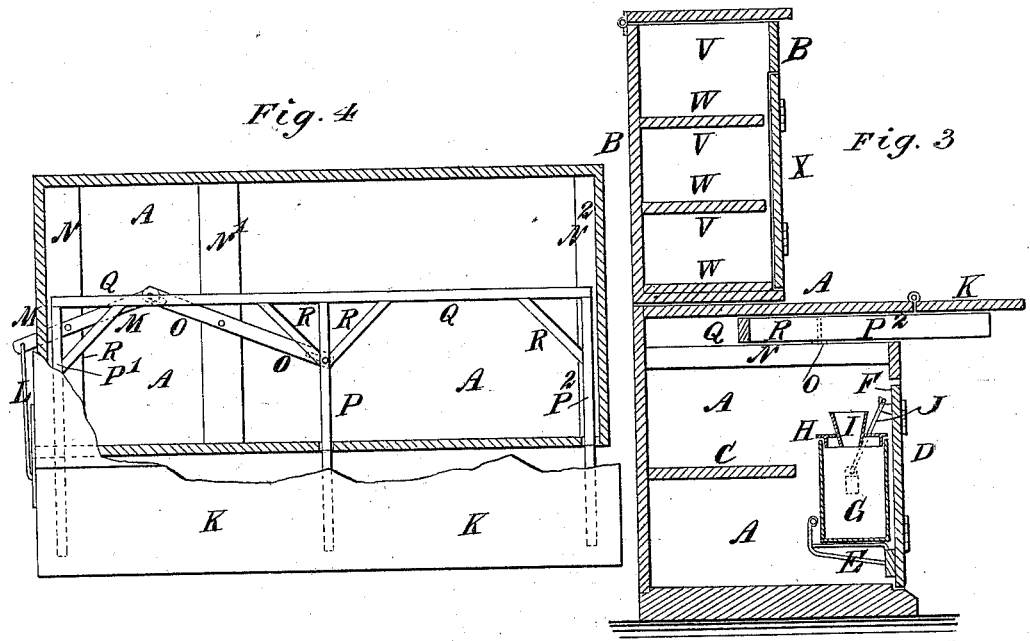
WITNESSES:
J. B. Walker
Herbert A. Thorpe
INVENTOR
H. C. Wheeler
BY Munn & Co
ATTORNEYS.

UNITED STATES PATENT OFFICE.

HENRY C. WHEELER, OF CARBONDALE, PENNSYLVANIA.

KITCHEN-CABINET.

SPECIFICATION forming part of Letters Patent No. 561,462, dated June 2, 1896.

Application filed August 8, 1895. Serial No. 558,670. (No model.)

*To all whom it may concern:*

Be it known that I, HENRY C. WHEELER, of Carbondale, in the county of Lackawanna and State of Pennsylvania, have invented certain new and useful Improvements in Kitchen-Cabinets, of which the following is a full, clear, and exact description.

This invention relates to certain improvements in kitchen-cabinets such as are employed for holding cooking utensils and the like; and the object of the invention is to provide a device of this character of a simple and inexpensive construction, which shall be compact and neat in appearance and provided with receptacles for holding utensils of different kinds, and which shall be adapted for use as a work-table or kneading-board in making bread.

The invention consists in certain novel features of the construction, combination, and arrangement of the various parts of the improved kitchen-cabinet, whereby certain important advantages are attained, and the device is made simpler, cheaper, and otherwise better adapted and more convenient for use than various other similar devices heretofore employed, all as will be hereinafter fully set forth.

The novel features of the invention will be carefully defined in the claim.

Reference is to be had to the accompanying drawings, forming part of this specification, in which similar letters of reference indicate corresponding parts in all the figures.

Figure 1 is a front elevation of my improvement, parts being broken away. Fig. 2 is an end elevation of the same, the upper part being shown in section. Fig. 3 is a sectional end elevation of the same, taken through the broken line $xxxx$, Fig. 1; and Fig. 4 is a plan view of the lower part of the same, partly in section.

The cabinet is made in two parts A B. The lower part A is made with shelves C, and serves as a receptacle for pans and other implements required in baking and other cooking operations. Access is had to the interior of the part A through doors D in the front. To one of the doors D is attached a bracket-frame E to receive a slop-bucket G, and a hook F is attached to the inner side of the door, and over which the bail of the bucket may be engaged. The slop-bucket G is made wide and thin, so as to be as little as possible in the way, and it is provided with a cover H, having a hopper I attached to it, through which slops may be poured into the bucket. The cover will prevent the contents of the said bucket from spattering out when the door is suddenly opened or closed.

To the forward edge of the top of the lower part A is hinged a table-leaf K, which when turned out or opened forms a convenient work-table. To one or both ends of the leaf K is pivoted the end of a rod L, the other end of which is pivoted to the end of a lever M, projecting through a slot in the end of the part A.

The lever M is fulcrumed between its ends to a bar N, secured in the lower part A near its top, and the inner end of the lever M is pivoted to the adjacent end of a lever O, one or both of the said ends being slotted to receive the pivot and allow the levers to have the necessary play. The lever O is fulcrumed between its ends to a bar N', and is thence extended to a lost-motion pivotal connection with an arm P.

P P' P² are arms which project through apertures in the front of the part A, near its top. The inner ends of the said arms are attached to a bar Q, the connection being strengthened by inclined braces R, attached to the arms and to the said bar Q. The bar Q rests and slides upon the ends of the three bars N N' N².

With this construction when the leaf K is opened out for use the arms P P' P² will be projected automatically to give the said leaf a firm support, and when the leaf K is closed the arms will be drawn back automatically, so as to be out of the way.

The upper part B of the cabinet is made of about half the depth of the lower part A and rests upon the rear part of the top of the said lower part, as shown in Figs. 2 and 3.

In the upper part B of the cabinet are formed three (more or less) bins S to receive flour and meal. The said bins are provided with false fronts T, inclining to the rearward and extending nearly to the bottoms of the said bins, as shown in Figs. 1 and 2, so that the contents of the said bins can be removed with scoops from the bottoms of the bins beneath the lower edges of the false fronts T.

The open fronts of the bins S are closed by a door U, hinged at its lower edge to the forward edge of the bottom of the upper part B of the cabinet. The door U when turned down or opened rests upon the table-leaf K and serves for a bread-board.

In one end of the upper part B of the cabinet is formed a closet V, provided with shelves W and a door X, hinged at its outer side edge to the casing of the said upper part B. The closet is designed to serve as a receptacle for spices and other materials required in small quantities in baking and other cooking.

The top Y of the upper part B of the cabinet is hinged at its rear edge to the top edge of the back of the said part B, so that the said top Y will serve as a lid or cover for convenience in putting the flour and meal into the said bins.

Having thus fully described my invention, I claim as new and desire to secure by Letters Patent—

In a kitchen-cabinet, the combination of a casing having a series of cross-pieces arranged across its upper part and provided in its wall with a series of openings, a leaf hinged to the casing above said openings, a bar extending along the top of the casing and arranged to slide on said cross-pieces, arms projecting from said bar and adapted when the bar is moved to pass through said openings in position to support the leaf when lowered, levers pivoted on the cross-pieces and coupled together at their adjacent ends, one lever having its opposite end connected to said bar and the other lever having its end extended outside the casing, and a link connected to the hinged leaf and also to the extended end of the said lever, substantially as set forth.

HENRY C. WHEELER.

Witnesses:
C. R. MUNN,
M. F. BARRETT.